United States Patent
Janssen et al.

(10) Patent No.: US 9,680,329 B2
(45) Date of Patent: Jun. 13, 2017

(54) INDUCTIVE WIRELESS CHARGING SYSTEM

(71) Applicant: DSM IP Assets B.V., Heerlen (NL)

(72) Inventors: Robert Hendrik Catharina Janssen, Echt (NL); Carel Frederik Constantijn Fitié, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 316 days.

(21) Appl. No.: 14/367,433

(22) PCT Filed: Dec. 11, 2012

(86) PCT No.: PCT/EP2012/075083
§ 371 (c)(1),
(2) Date: Jun. 20, 2014

(87) PCT Pub. No.: WO2013/092305
PCT Pub. Date: Jun. 27, 2013

(65) Prior Publication Data
US 2014/0375260 A1    Dec. 25, 2014

(30) Foreign Application Priority Data
Dec. 22, 2011    (EP) .................................... 11195235

(51) Int. Cl.
*H02J 7/00*    (2006.01)
*H02J 7/02*    (2016.01)
*H01F 38/14*    (2006.01)
*H02J 5/00*    (2016.01)

(52) U.S. Cl.
CPC .............. *H02J 7/025* (2013.01); *H01F 38/14* (2013.01); *H02J 5/005* (2013.01); *H02J 7/0042* (2013.01)

(58) Field of Classification Search
CPC ........................................................ H02J 7/025
USPC ........................................................ 320/108
See application file for complete search history.

(56) References Cited

U.S. PATENT DOCUMENTS

| 4,838,797 A | 6/1989 | Dodier |
| 5,949,155 A | 9/1999 | Tamura et al. |
| 2011/0050382 A1* | 3/2011 | Baarman ................... H01F 1/26 336/221 |

FOREIGN PATENT DOCUMENTS

| DE | 197 26 840 | 1/1998 |
| EP | 0 385 502 | 9/1990 |
| WO | WO 2011/001812 | 1/2011 |

OTHER PUBLICATIONS

International Search Report for PCT/EP2012/075083 mailed Jun. 10, 2013.

* cited by examiner

Primary Examiner — Suresh Memula
(74) Attorney, Agent, or Firm — Nixon & Vanderhye P.C.

(57) ABSTRACT

The invention relates to an inductive wireless charging system comprising a charger, a chargeable mobile device, a first coil for or in the charger, and a second coil for or in the chargeable mobile device, wherein each of the first and the second coil comprises a core part consisting of a soft magnetic material, and each of the first and the second coil is embedded in a polymer bonded soft magnetic material. The invention also relates to a charger, respectively a chargeable mobile device for an inductive wireless charging system, comprising at least one coil comprising a core part consisting of a soft magnetic material, wherein the coil is embedded in a polymer bonded soft magnetic material.

11 Claims, 1 Drawing Sheet

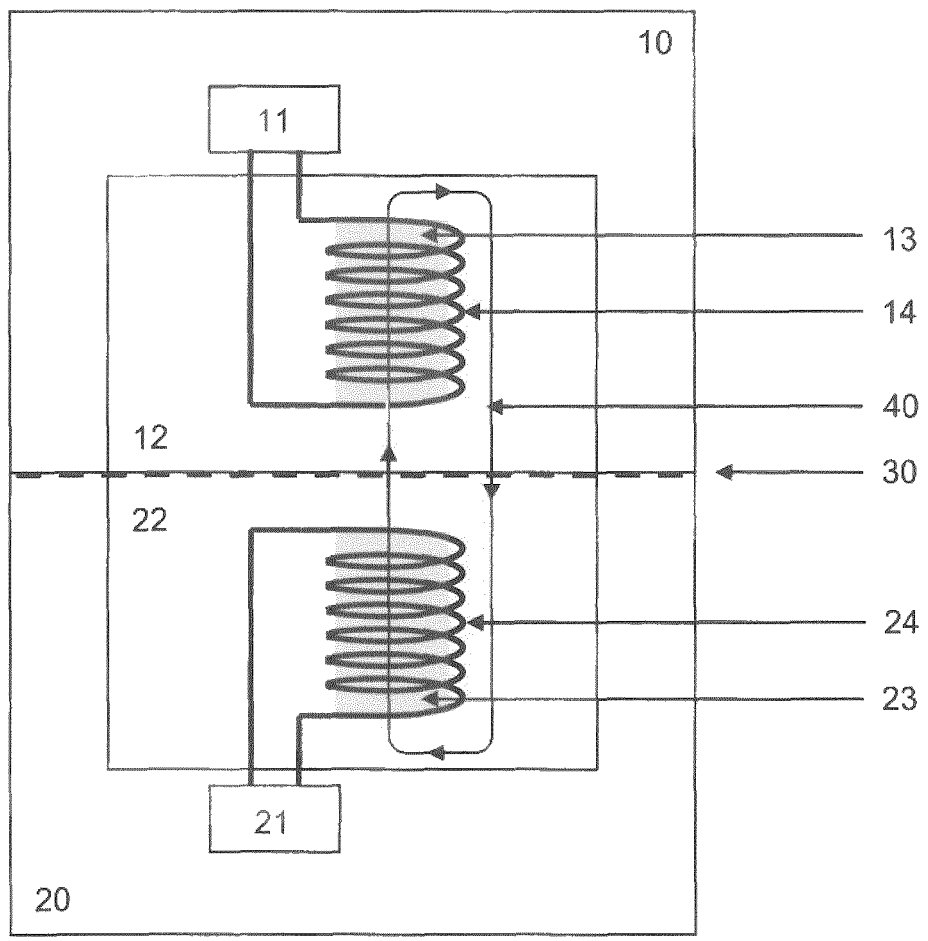

INDUCTIVE WIRELESS CHARGING SYSTEM

This application is the U.S. national phase of International Application No. PCT/EP2012/075083 filed 11 Dec. 2012 which designated the U.S. and claims priority to EP 11195235.4 filed 22 Dec. 2011, the entire contents of each of which are hereby incorporated by reference.

The invention relates to an inductive wireless charging system comprising two coils, one for or in a charger (e.g. a loading pad) and one for or in a chargeable mobile device.

Coils comprised by charging systems are generally surrounded by air and/or materials with a low magnetic permeability and optionally contained in a housing comprising a magnetic shielding material. The coils have a core space which is either unfilled or occupied by a solid ferrite core or filled with a material with a low magnetic permeability.

Problems with inductive wireless charging systems include the large number of windings needed to attain a certain level of inductance to generate a sufficiently large voltage in the secondary coil and associated large power transfer in the charging system. In mobile devices, the space for windings is limited and ohmic loss due to the total length of the wire because of the large number of windings is an important loss mechanism in the charging system.

The aim of the invention is to reduce or solve these problems.

This aim has been achieved with the inductive wireless charging system according to the invention. The inventive inductive wireless charging system comprises
  a charger and
  a chargeable mobile device, and comprising
  a first coil for or in the charger, and
  a second coil for or in the chargeable mobile device,
wherein each of the first and the second coil comprises a core part consisting of a soft magnetic material, and each of the first and the second coil is embedded in a polymer bonded soft magnetic material, or
wherein each of the first and the second coil is embedded in a polymer bonded soft magnetic material, one of these coils (coil A), i.e. one of the first coil or the second coil, comprises a core part consisting of a soft magnetic material and the other coil (coil B) comprises a cavity for receiving the embedded coil A.

The advantage of the coils in the inductive wireless charging system comprising a core part consisting of a soft magnetic material and being embedded in a polymer bonded soft magnetic material (herein also referred to as PBSM material) is that when charger and chargeable mobile device are brought together, higher voltages and power transfer are obtained at a same current level and a same number of windings in the coils. Alternatively, at a given operating frequency, the same voltage and power transfer can be obtained with less windings, smaller coil size, less ohmic losses and lower cost for both charger and chargeable mobile device. Optionally, the benefit of lower ohmic losses in the reduced number of windings may be sacrificed by increasing the operating frequency of the wireless charging system in order to increase the voltages and power transfer even further. Overmolded coils enable working with less coils at higher frequencies, leading to higher voltages in the secondary coil, while keeping ohmic losses limited.

The "magnetic flux guide" constituted by the PBSM material in which the coils are embedded also provides inherent shielding, meaning that no or less shielding material is needed in charger and CMD and less stray field is produced on the charging interface side of the coils.

In the inductive wireless charging system according to the invention, the first coil is typically comprised by the charger, whereas the second coil can be comprised by the chargeable mobile device or by a charge supply unit for the chargeable mobile device and to be engaged in electrical contact with the chargeable mobile device prior to charging.

In a preferred embodiment of the inductive wireless charging system according to the invention, the soft magnetic material in respectively the first and second coil and the PBSM material embedding respectively the first and second coil constitute a closed loop magnetic flux guide once the first coil and the second coil are engaged in interfacial contact with each other for or during charging of the chargeable mobile device by the charger. The magnetic flux guide is herein understood to be the loop entering one of the first or second coil in the core space at one extremity, passing through the core space of said coil, exiting the core space of the said coil, entering the other of the first and second coil in the core space, passing through the core space of the other coil, exiting the core space of the other coil at another extremity, and going around the two coils, entering the core space of the one coil again. Such a magnetic flux guide with a closed loop of soft magnetic material and PBSM material is being formed, when the magnetic flux guide is not interrupted by a material of low magnetic permeability, other than some air voids at the interface between the first and second coil. Thus there no surface layer of low magnetic permeability at the interface between the first and second coil, and no air gap between the soft magnetic material and PBSM material at either one of the two extremities of the core spaces. The effect of this embodiment is that either even higher voltages and higher power transfer are obtained, and/or a lower number of windings can be used.

In another preferred embodiment of the inductive wireless charging system according to the invention, the first coil has a first front end covered with a first layer having a first surface area,
  the second coil has a second front end covered with a second layer having a second surface area,
  the first surface area and the second surface area being engaged in interfacial contact, or intended for being engaged in interfacial contact with each other for or during charging of the chargeable mobile device by the charger,
  the first surface layer consists of a PBSM material and constitutes an integral part of the PBSM material in which the first coil is embedded, and
  the second surface layer consists of a PBSM material and constitutes an integral part of the PBSM material in which the second coil is embedded.

The advantage of this embodiment is that a closed loop magnetic flux guide of soft magnetic material is obtained without the risk of misalignment of the surfaces of the PBSM material embedding the coils and the core parts comprised by the coils.

In the above embodiments the coils are suitably spiral coils, more particular flat spiral coils to allow for flat interface configuration.

In a further preferred embodiment of the inductive wireless charging system according to the invention, each of the first and the second coil is embedded in a polymer bonded soft magnetic material, one of the coils (coil A) comprises a core part consisting of a soft magnetic material and the other coil (oil B) comprises a cavity for receiving the embedded coil A. The coil A is suitably comprised by the charger and positioned in a part protruding from a surface area of the charger, respectively comprised by the chargeable mobile device and positioned in a part protruding from a surface are of the chargeable mobile device, whereas the cavity in coil B, comprised by the chargeable mobile device, respectively by the charger, has an opening for allowing the protruding part with the coil A to penetrate in the cavity.

Suitably, in this embodiment both the first and the second coils are solenoids, wherein the inner diameter of the first coil is larger than the outer diameter of the second coil, more particular the inner diameter of the cavity comprised by the first coil is larger than the outer diameter of the embedded second coil, allowing the first coil to slide over the second coil when being positioned for charging. Such positioning allows the coils to share a common core space filled with PBSM material. With both coils being embedded in the PBSM material, a closed loop of PBSM material is created. In general, the same benefits apply as in the other embodiments: higher voltages and power transfer are obtained at a same current level and a same number of windings in the coils; alternatively, the same voltage and power transfer can be obtained with less windings, smaller coil size, less ohmic losses and lower cost for both charger and chargeable mobile device. Additionally, physically sliding the cores over each other will provide automatic alignment of the coils, leading to maximum flux coupling between the coils and maximum power transfer. The inductive wireless charging system according to the invention suitably comprises a core part, comprised by at least one of the first and second coil, consisting of an inorganic soft magnetic material.

The inorganic soft magnetic material can be any inorganic soft magnetic material suitable for use in a core part of a coil to increase the magnetic permeability thereof. Soft magnetic materials are described, for example, in the following handbooks: (1) Feynman, R. P., Leighton, R. B., Sands, M. *The Feynman lectures on Physics*; The New Millennium Edition, Basic Books: New York, 2010, Vol. 2, pp 37-1-37-13; describes Magnetic Materials; (2) Williams. B. W. *Power Electronics: Devices, Drivers, Applications and Passive Components*. McGraw-Hill; $2^{nd}$ edition, 1992; pp 617-679, describes Soft Magnetic Materials; and (3) Herzer, G. in *Handbook of Magnetic Materials;* Vol. 10. Buschow, K. H. J. Ed. Elsevier Science B.V.: 1997, pp 415-462, describes Nanocrystalline Soft Magnetic Alloys.

Suitable inorganic soft magnetic materials are, for example, ferromagnetic metals and alloys, ferrites, ferromagnetic amorphous alloys and ferromagnetic nanocrystalline alloys. Suitable ferromagnetic metals and alloys are iron and iron/zinc alloys. Preferably, the inorganic soft magnetic material comprises a ferrite, for example a NiZn ferrite or a MnZn ferrite.

As an alternative, the soft magnetic material in the core part in either the first and/or the second coil, is a PBSM material.

The core part made of the soft magnetic material, more particular made of the PBSM material, may be a drum or rod, and either be inserted into the core space of the coil, or the coil having been wound around the drum or rod. The core part can also be a bobbin, with the coil having been wound around the bobbin.

In case the soft magnetic material in the core part is a PBSM material, said material may also have been injected into the core space.

In a preferred embodiment thereof, at least one of the first and second coil in the inductive wireless charging system is filled with a PBSM material.

The filling is suitably accomplished, for example, by a melt injection moulding process.

Even more preferably, the coil, or even better all the coils, are filled with and embedded in the same PBSM material, and wherein the filling and embedding in the PBSM material is accomplished in a single step melt injection moulding process.

The advantage is that a closed loop magnetic field guide is created without the need for extra steps to close the gap between the core part and the embedding material. Furthermore, since there is no such gap, there is a better power transfer.

The PBSM material used in the inductive wireless charging system according to the invention can in principle be any polymeric composition or polymeric material comprising a polymer and a soft magnetic filler.

The polymer can be any polymer suitable for moulding over and embedding the coil. The polymer can, for example, comprise or be a thermoplastic polymer and/or a thermoset polymer.

Suitably, the PBSM material comprises a thermoplastic polymer. The thermoplastic polymer can in principle be any thermoplastic polymer, for example, a saturated polyester polymer, a polyamide polymer a thermoplastic elastomer.

The PBSM material may also comprise a thermoset polymeric material, such as a thermoset unsaturated polyester or a thermoset epoxy resin.

Also the soft magnetic filler can be any filler with soft magnetic properties that can be comprised in a thermoplastic polymer and/or a thermoset polymer moulding composition. For the soft magnetic materials that can be used herein as filler reference is made to the handbooks mentioned herein above. Suitable soft magnetic fillers are, for example, ferromagnetic metals and alloys, ferrites, ferromagnetic amorphous alloys and ferromagnetic nanocrystalline alloys.

Preferably, the soft magnetic filler comprises a ferritic filler, in other words a filler comprising or consisting of a ferrite material. The advantage of ferrites is that they retain their high magnetic permeability at high frequencies in particular in the range of 200 kHz-10 MHz.

The PBSM material used in the inductive wireless charging system according to the invention may have a magnetic permeability varying over a wide range. Suitably, the PBSM material has a magnetic permeability in the range of 1.1-100, preferably 1.5-50, or even 3-20. Herein the magnetic permeability is the magnetic permeability measured at 100 kHz by the voltmeter-ammeter method according to IEC 60406-6 second edition 2003-6 part 5.

The advantage of a higher minimum magnetic permeability is that the power transfer is further increased. Alternatively coils with less windings can be used at in the wireless charging system to allow for the same power transfer. Or a lower frequency can be applied to reach the same power transmission. On the other hand a lower maximum magnetic permeability has the advantage that a lower amount of soft magnetic filler is needed while still obtaining very good results and also filling of the core space with the PBSM material is improved.

The coils in the inductive wireless charging system according to the invention can have any shape suitable for such a system, for example a solenoid, a spiral coil or multilayer assemblies comprising such elements. Preferably, at least one of the two coils is a spiral coil, more preferably both coils are spiral coils. The advantage of spiral coils is that they provide a large number of windings in a flat coil shape configuration.

Preferably, at least one of the first and second coil, and more preferably both coils in the inductive wireless charging system according to the invention is a spiral coil having a height (H) and a width (W) having a ratio W/H of at least 2, preferably at least 10. The height H is herein defined as the height of the coil measured in the direction perpendicular to the plane of the windings and parallel to the central magnetic field. The width W is herein defined as the diameter of the winding in the coil having the largest diameter.

Also preferably, at least one of the first and second coil, and more preferably both coils in the inductive wireless charging system according to the invention is a spiral coil having a central point, wherein the distance between the centre of the spiral coil and the interface surface area is at most 5 mm, preferably at most 2 mm.

The advantage of charging devices with such flat spiral coils positioned closely to the interface surface area is that thinner electronic devices can be designed, meanwhile still having the advantages of the charging devices with the embedded coils according to the invention.

The inductive wireless charging system according to the invention, as well as any preferred embodiment thereof, and any combination thereof, is suitably applied in an electrical vehicle, an electrical household appliance, or an electronic device. Examples of such electrical vehicle are, for example, electrical cars, hybrid cars, electrically driven trucks and public transport busses, and electrical bicycles. Examples of suitable electrical household appliances include tooth brushes, shaving apparatus. Suitable electronic devices are, for example, laptops and cellphones.

If so applied, one of the two embedded coils is comprised by a chargeable mobile device, such as the electrical vehicle, respectively the electrical household appliance, whereas the other coil is connected to an electrical supply ground station.

The invention also relates to charger for an inductive wireless charging system, comprising at least one coil comprising a core part consisting of a soft magnetic material, wherein the coil is embedded in a polymer bonded soft magnetic material (PBSMM).

The invention also relates to chargeable mobile device for an inductive wireless charging system, comprising at least one coil comprising a core part consisting of a soft magnetic material, wherein the coil is embedded in a polymer bonded soft magnetic material (PBSMM).

Preferably the coil in said chargeable mobile device is a spiral coil having a height (H) and a width (W) having a ratio W/H of at least 2, more preferably at least 10. Also preferably the coil is a spiral coil having a central point, wherein the distance between the centre of the spiral coil and the interface surface area is at most 5 mm, preferably at most 2 mm. Suitable, these two features are combined, allowing for very thin and flat designs. This embodiment is most suitably applied in an electronic device.

In another embodiment of the invention, the coil in the chargeable mobile device is a solenoid coil, wherein the coil is embedded in a polymer bonded soft magnetic material and the coil comprises a cavity for receiving a solenoid coil embedded in a polymer bonded soft magnetic material on a charger. This embodiment is most suitably applied in an electric household appliance or an electric vehicle. The invention in particular relates to a charger and chargeable mobile device, as mentioned here above, incorporating one or more embodiments of the inductive wireless charging system according to the present invention.

The a charger as well as the chargeable mobile device, as such as well as in the inductive wireless charging system according to the present invention, may each comprise a single coil or otherwise multiple coils. These multiple coils may be arranged in parallel or in series (multi-layer)). Preferably the coil, respectively all coils in the multiple coil arrangement in either the charger and/or the chargeable mobile device are filled with and embedded in a polymer bonded soft magnetic material (PBSMM).

The charger according to the invention suitably is comprised by a docking station. Suitably, the docking station comprises system for placing the chargeable mobile device on the docking station in order to properly position and align the coil or coils in the chargeable mobile device in respect of the coil or coils in the charger. Suitably the placing system comprises one or more permanent magnets and/or a lighting alignment system, or the charger comprises an intelligent array of coils.

The coils and the windings therein can be made from any type of wire suitable for electrical wiring systems. Preferably the coils are made from Litz wire to reduce skin effects at higher frequencies and decrease resistance.

The invention is further illustrated with the following example and comparative example.

FIG. 1. Schematic drawing of an inductive wireless charging system according to the invention.

FIG. 1 shows a schematic drawing of an inductive wireless charging system according to the invention, comprising a mobile device (10) and a charger (20). The mobile device (10) comprises an electronic circuit (11), a molded PBSM material section (12) and a soft magnetic material filled core area (13) inside a receiver coil (14). The charger (20) comprises an electronic circuit (21) a molded PBSM material section (22) and a soft magnetic material filled core area (23) inside a sending coil (24). The mobile device (10) and the charger (20) are positioned against each other and are in contact with each other at the interface surface area (30). During charging the magnetic flux will run through the molded PBSM material sections (12) and (22) as schematically indicated by the magnetic flux lines (40).

The performance of the system as depicted in FIG. 1 is primarily dominated by the magnetic permeability of the PBSM material in the sections (12) and (22) and in the core areas (13) and (23).

If the PBSM material in these sections and core areas has a magnetic permeability of just only 1.5, the performance of the system in terms of power transfer i.e voltage in the receiver coil is already increased up to about 50% compared to a corresponding system where the PBSM material is completely absent, or in other words where the two coils would be completely surrounded by air. Even in case a ferritic core would have been inserted in each of the two coils surrounded by air, the performance of the system would still be far less good than the system according to the invention as described here.

If the PBSM material has permeability of 6, the performance of the system in terms of power transfer is increased up to a factor of about 6, compared to the corresponding system where the PBSM material is completely absent.

Herein, it is assumed that the mobile device (10) and the charger (20) are in full contact at the interface surface area (30), whereby the PBSM material in the sections (12) and (22) and in the core areas (13) and (23) together form a closed loop magnetic flux guide. However, the performance of the system is hardly affected in case of a small air gap between the mobile device (10) and the charger (20). With a magnetic flux length of, for example 10 cm, and an air gap of, for example 1 mm, there is still only a very limited reduction in the power transfer efficiency. The improvement obtained with the PBSM material having a magnetic permeability of 6, allows the number of windings in the coils to be reduced with factor 2.5, while still having the same power transfer. This allows the design of much thinner mobile devices.

The invention claimed is:

1. An inductive wireless charging system comprising:
a charger,
a chargeable mobile device,
a first coil for or in the charger, and
a second coil for or in the chargeable mobile device, wherein
the first and the second coils comprise a core part consisting of an inorganic polymer bonded soft magnetic (PBSM) material, and wherein
the first and the second coils are embedded in the same inorganic PBSM material, and wherein
the first and second coils are filled and embedded in the same inorganic PBSM material by a single step melt-injection moulding process.

2. The inductive wireless charging system according to claim 1, wherein the charger comprises the first coil, and the chargeable mobile device or a charge supply unit for the chargeable mobile device comprises the second coil.

3. The inductive wireless charging system according to claim 1, wherein the PBSM material in the core and embedding the first and second coil constitutes a closed loop magnetic flux guide once the first coil and the second coil are engaged in interfacial contact with each other for or during charging of the chargeable mobile device by the charger.

4. The inductive wireless charging system according to claim 1, wherein
the first coil has a first front end covered with a first layer having a first surface area,
the second coil has a second front end covered with a second layer having a second surface area,
the first surface area and the second surface area engaged in interfacial contact, or are adapted to be engaged in interfacial contact with each other for or during charging of the chargeable mobile device by the charger, and
the first surface layer consists of and constitutes an integral part of the inorganic PBSM material in which the first coil is embedded, and the second surface layer consists of and constitutes an integral part of the inorganic PBSM material in which the second coil is embedded.

5. The inductive wireless charging system according to claim 1, wherein inorganic PBSM material is a NiZn ferrite or a MnZn ferrite.

6. The inductive wireless charging system according to claim 1, wherein the inorganic PBSM material comprises a polymer and a soft magnetic filler.

7. The inductive wireless charging system according to claim 1, wherein the inorganic PBSM material comprises a thermoplastic polymer and/or a thermoset polymer.

8. The inductive wireless charging system according to claim 1, wherein the inorganic PBSM material comprises a ferrite.

9. The inductive wireless charging system according to claim 1, wherein the inorganic PBSM material has a magnetic permeability in the range of 1.1-100, measured at 100 kHz by the voltmeter-ammeter method according to IEC 60406-6 second edition 2003-6 part 5.

10. The inductive wireless charging system according to claim 1, wherein at least one of the first and second coils is a spiral coil.

11. The inductive wireless charging system according to claim 1, wherein one of the embedded first and second coils is comprised by an electrical vehicle, or an electrical household appliance.

* * * * *